(12) United States Patent
Sarkar et al.

(10) Patent No.: US 8,194,719 B2
(45) Date of Patent: *Jun. 5, 2012

(54) METHOD AND APPARATUS FOR MAXIMIZING STANDBY TIME IN REMOTE STATIONS CONFIGURED TO RECEIVE BROADCAST DATABURST MESSAGES

(75) Inventors: Sandip Sarkar, San Diego, CA (US); Edward G. Tiedemann, Jr., San Diego, CA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 12/420,900

(22) Filed: Apr. 9, 2009

(65) Prior Publication Data

US 2009/0285267 A1 Nov. 19, 2009

Related U.S. Application Data

(63) Continuation of application No. 11/312,195, filed on Dec. 19, 2005, now Pat. No. 7,519,106, which is a continuation of application No. 10/702,174, filed on Nov. 5, 2003, now Pat. No. 6,977,957, which is a continuation of application No. 09/503,031, filed on Feb. 11, 2000, now Pat. No. 6,728,300.

(51) Int. Cl.
*H04B 1/69* (2006.01)
*H04Q 1/30* (2006.01)
*H04W 68/02* (2009.01)

(52) U.S. Cl. ........ 375/146; 375/147; 340/7.28; 455/458
(58) Field of Classification Search ................. 375/140, 375/141, 146, 147, 260, 262, 265, 308, 329, 375/340, 341; 370/330, 335, 336, 337, 342, 370/344, 345, 347, 441, 442, 458; 340/3.21, 340/7.1, 7.2, 7.21, 7.28; 455/426.1, 450, 455/458
See application file for complete search history.

(56) References Cited

U.S. PATENT DOCUMENTS

| 5,103,459 A | 4/1992 | Gilhousen et al. |
| 5,392,287 A | 2/1995 | Tiedemann, Jr. et al. |

(Continued)

FOREIGN PATENT DOCUMENTS

JP 07059161 3/1995

(Continued)

OTHER PUBLICATIONS

ANSI/TIA/EIA/IS-637A, Short Message Service for Spread Spectrum Systems, Sep. 1999.

(Continued)

*Primary Examiner* — Young T. Tse
(74) *Attorney, Agent, or Firm* — Stanton Braden

(57) ABSTRACT

A wireless telecommunications system includes a base station, a plurality of remote stations, a first channel for general page messages containing paging information and broadcast databurst message references, and an auxiliary channel for broadcast databurst notification indicators for the purpose of increasing standby time in remote stations configured to receive broadcast databurst messages.

29 Claims, 8 Drawing Sheets

U.S. PATENT DOCUMENTS

| | | | |
|---|---|---|---|
| 5,473,607 | A | 12/1995 | Hausman et al. |
| 5,481,254 | A | 1/1996 | Gaskill et al. |
| 5,509,015 | A | 4/1996 | Tiedemann, Jr. et al. |
| 5,703,902 | A | 12/1997 | Ziv et al. |
| 6,111,865 | A | 8/2000 | Butler et al. |
| 6,138,034 | A | 10/2000 | Willey |
| 6,157,633 | A | 12/2000 | Wright |
| 6,393,295 | B1 * | 5/2002 | Butler et al. ............... 455/458 |
| 6,421,540 | B1 | 7/2002 | Gilhousen et al. |
| 6,480,504 | B1 | 11/2002 | Wang et al. |
| 6,505,058 | B1 * | 1/2003 | Willey ............... 455/574 |
| 6,577,608 | B1 * | 6/2003 | Moon et al. ............... 370/311 |
| 6,687,285 | B1 | 2/2004 | Jou |
| 6,711,413 | B1 | 3/2004 | Heidari |

FOREIGN PATENT DOCUMENTS

| | | |
|---|---|---|
| JP | 8280051 | 10/1996 |
| JP | 9504924 | 5/1997 |
| JP | 10022898 | 1/1998 |
| WO | WO9512955 A1 | 5/1995 |
| WO | WO9854919 A2 | 12/1998 |

OTHER PUBLICATIONS

European Search Report—EP07116267, Search Authority-Berlin-Dec. 21, 2007.

TIA, "cdma2000 Series TIA/EIA/IS-2000", Aug. 1999.

TIA/EIA/IS-2000A;TIA/EIA Interim Standard-cdma2000series (Mar. 2003).

TIA/EIA-95-B;Mobile Station-Base Station Compatibility Standard for Wideband Spread Spectrum Cellular Systems (Mar. 1999).

International Search Report—PCT/US01/003981, International Search Authoirty—European Patent Office—Jul. 26, 2001.

TIA/EIA-IS-95, Jul. 1993.

TIA/EIA-IS-95-A, May 1995.

* cited by examiner

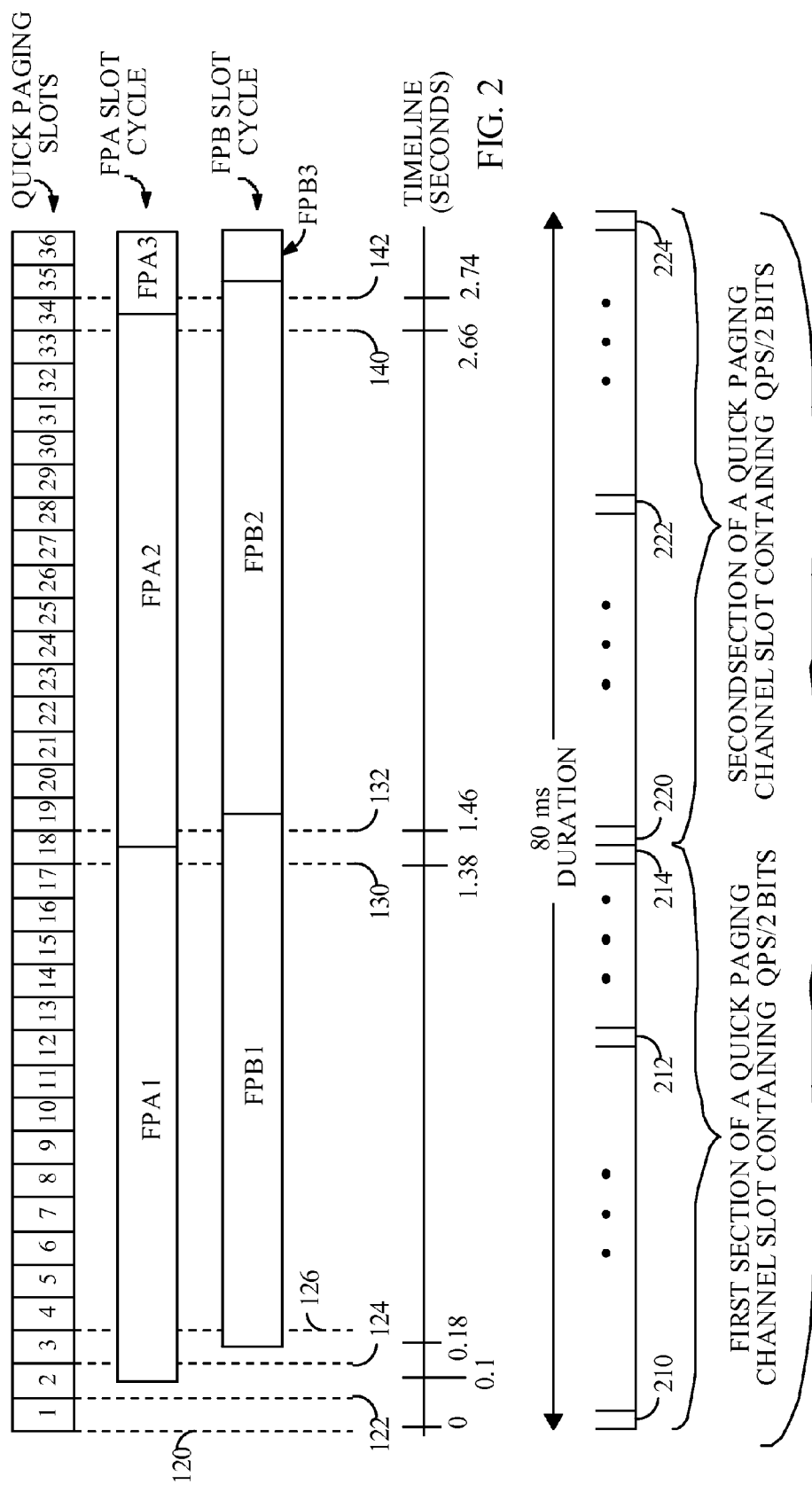

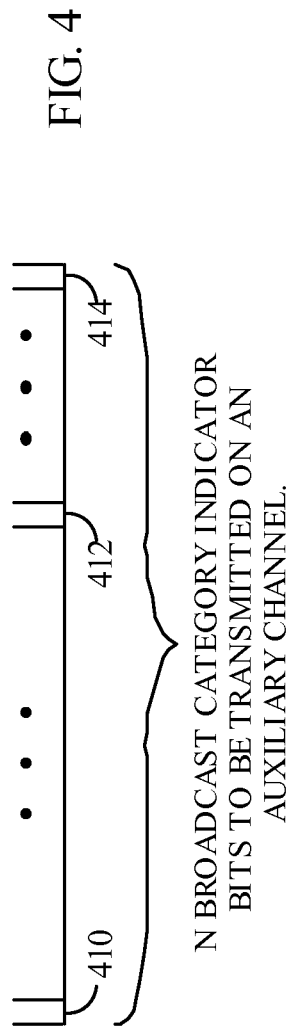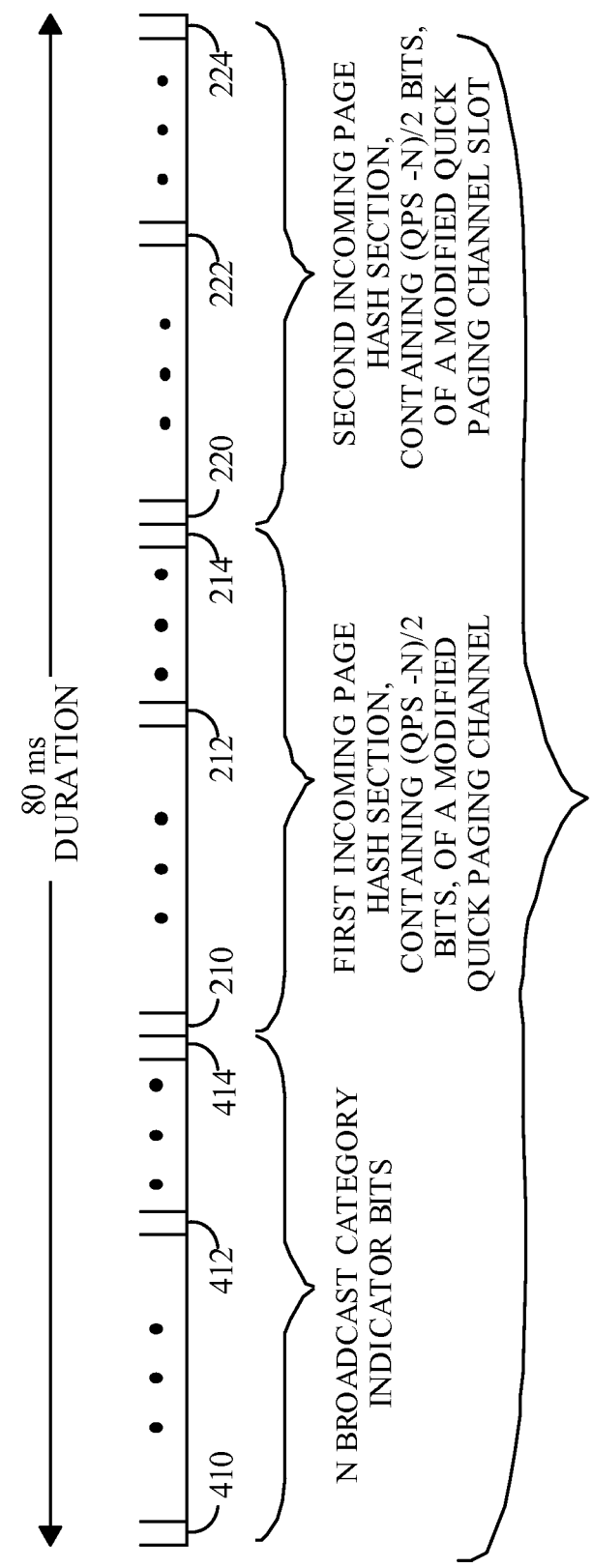

METHOD AND APPARATUS FOR MAXIMIZING STANDBY TIME IN REMOTE STATIONS CONFIGURED TO RECEIVE BROADCAST DATABURST MESSAGES

CLAIM OF PRIORITY UNDER 35 U.S.C. §120

The present Application for Patent is a Continuation and claims priority to patent application Ser. No. 11/312,195, filed Dec. 19, 2005, now issued as U.S. Pat. No. 7,519,106, which is a Continuation of patent application Ser. No. 10/702,174, filed Nov. 5, 2003, now issued as U.S. Pat. No. 6,977,957, which is a Continuation of patent application Ser. No. 09/503,031, entitled "A METHOD AND APPARATUS FOR MAXIMIZING STANDBY TIME IN REMOTE STATIONS CONFIGURED TO RECEIVE BROADCAST DATABURST MESSAGES" filed Feb. 11, 2000, now U.S. Pat. No. 6,728,300, all of which are and assigned to the assignee hereof and hereby expressly incorporated by reference herein.

BACKGROUND

1. Field

The present invention relates to the transmission and reception of broadcast databurst messages within a telecommunications system. More particularly, the present invention relates to a novel and improved method and apparatus for increasing the standby time of the receiver of broadcast databurst messages in a wireless telecommunications system.

2. Background

The cdma2000 cellular telephone standard proposal issued by the Telecommunications Industry Association (TIA), entitled "cdma2000 Series TIA/EIA/IS-2000," published in August of 1999, hereinafter referred to as cdma2000, uses advanced signal processing techniques to provide efficient and high quality phone service, and is incorporated herein by reference. For example, a cdma2000 compliant cellular telephone system utilizes decoding, error detection, forward error correction (FER), interleaving and spread spectrum modulation in order to make more efficient use of the available radio frequency (RF) bandwidth, and to provide more robust connections. In general, the benefits provided by cdma2000 include longer talk time and fewer dropped calls when compared to other types of cellular telephone systems.

To conduct communications in an orderly manner, the cdma2000 standard provides a set of highly encoded channels over which data having different functions is transmitted. These highly encoded channels include one or more full paging channels, for carrying paging messages that notify cellular telephones or other types of wireless terminals, hereinafter referred to as remote stations, that an incoming request to communicate is pending. The full paging channel is further described below. Additionally, cdma2000 provides for a channel that is non-highly encoded, such as the quick paging channel further described below, to extend the standby time of remote stations. A new version of cdma2000, often referred to as cdma2000 Release A, is currently in ballot. The ballot version of cdma2000 Release A can be found in the December 1999 versions of following six TIA documents: PN-4693, PN-4694, PN-4695, PN-4696, PN-4797, and PN-4898. Each of these documents is incorporated herein by reference. This balloted version of cdma2000 Release A is hereinafter referred to as cdma2000A. cdma2000A introduces the Forward Common Control Channel (F-CCCH) and the Forward Broadcast Channel (F-BCCH). Whereas the full paging channel of cdma2000 uses a full paging channel to carry both general page messages (discussed below) and broadcast databurst messages, cdma2000A uses the F-CCCH to carry the general page messages, and uses the F-BCCH to carry broadcast databurst messages. The present invention is directed both at cdma2000 systems and at cdma2000A systems.

FIG. 1 is a block diagram of a simplified cellular telephone system that may be used to implement the present invention. Remote stations such as remote stations 10 (typically cellular telephones) are located around base stations 12. The remote stations 10a and 10b are in an active mode and are therefore interfacing with one or more base stations 12 using radio frequency (RF) signals modulated in accordance with the CDMA signal processing techniques of the cdma2000 standard. A system and method for modulating RF signals in accordance with CDMA modulation is described in U.S. Pat. No. 5,103,459 entitled "System and Method for Generating Signal Waveforms in a CDMA Cellular Telephone System" assigned to the assignee of the present invention and incorporated herein by reference. The other remote stations 10 are in standby mode and are therefore monitoring either a full paging channel for page messages indicating a request to communicate, or they are monitoring a quick paging channel for indicator bits indicating whether a message is expected on a full paging channel. An exemplary quick paging channel is given in U.S. Pat. No. 6,421,540, issued Jul. 16, 2002, entitled "A Method And Apparatus For Maximizing Standby Time Using A Quick Paging Channel," which is a continuation-in-part of U.S. Pat. No. 6,393,295, filed Jul. 9, 1997 entitled "Dual Event Slotted Paging", which is a continuation-in-part of U.S. Pat. No. 6,111,865, filed May 30, 1997 also of the same title, all of which are incorporated by reference herein.

In a preferred embodiment, each base station 12 generates forward link signals comprised of a set of forward link channels. The channels are established by a set of orthogonal Walsh codes. A Walsh code is used to modulate the data associated with a particular channel. The channels are categorized by function and include a pilot channel over which a phase offset pattern is repeatedly transmitted, a synch channel over which synchronization data is transmitted, including the absolute system time and the phase offset of the associated pilot channel, and traffic channels over which the data directed to the terminals 10 is transmitted. The traffic channels are normally assigned to transmit data to a particular remote station 10 for the duration of the interface with that particular base station. It should be understood that other types of codes and code lengths, along with other control channels, may be used in like systems.

Additionally, in accordance with one embodiment, one or more of the Walsh channels is designated as a quick paging channel, and one or more of the Walsh channels is designated as a full paging channel. The designation and operation of the full paging channel is preferably performed in accordance with the paging channel specified by the cdma2000 standard. Some methods and apparatus for performing paging substantially in accordance with the cdma2000 standard are described in U.S. Pat. No. 5,392,287 (the '287 patent) entitled "Apparatus And Method For Reducing Power Consumption In A Mobile Communications Receiver" and U.S. Pat. No. 5,509,015 (the '015 patent) entitled "Method And Apparatus For Scheduling Communications Between Transceivers" both assigned to the assignee of the present invention and incorporated herein by reference.

As described in the '287 and '015 patents, and as specified by the cdma2000 standard, the full paging channel is divided into time slots. The time slots are assigned to groups of remote stations 10. The assignment is performed based on the international mobile subscriber ID (IMSI) which is unique for each remote station 10, or other terminal identification information such as one or more mobile identification numbers (MIN). In alternative embodiments other identification information may also be used including the electronic serial number (ESN) of the remote station 10 or the temporary mobile subscriber ID (TMSI). The various types of identification information that may be used will be referred to hereinafter collectively as the mobile ID. The quick paging channels are also divided into time slots.

Characteristics of the full paging channel along with a detailed explanation of the quick paging channel are described in U.S. Pat. No. 6,421,540, issued Jul. 16, 2002, entitled "A Method And Apparatus For Maximizing Standby Time Using A Quick Paging Channel," assigned to the assignee herein, and incorporated by reference herein. Paging schemes disclosed in U.S. Pat. No. 6,393,295, issued May 21, 2002, entitled "Dual Event Slotted Paging," and in U.S. Pat. No. 6,111,865, issued Aug. 29, 2000, which are incorporated by reference herein, illustrate the basic implementation of a full paging channel in combination with a quick paging channel to provide terminal paging.

A full paging channel is a shared channel, meaning that the messages transmitted on this channel can be simultaneously decoded by many remote stations. The highly encoded full paging channel, which is divided into time slots of a predetermined duration called full paging slots, contain, amongst other messages, paging messages to indicate when there is an incoming call for a particular remote station. These paging messages can also be used to instruct a remote station to bring up a dedicated traffic channel to receive a databurst message that is directed to it. Databurst messages that are directed to an individual remote station are hereinafter referred to as a point-to-point databurst message, and are commonly called SMS (short message service) messages. "Joe, I got stuck in a meeting. I'll be home 30 minutes late for dinner," is an example of the contents of the textual portion of a point-to-point databurst message.

In an alternate embodiment that follows the techniques of cdma2000A, the paging messages discussed above are transmitted on the F-CCCH in lieu of the full paging channel.

A quick paging channel is a shared channel that indicates to a remote station whether a page for that remote station is about to be transmitted on the paging channel. The quick paging channel is divided up into quick paging slots of a predetermined duration, which are preferably shorter than the duration of the full paging slots. In one exemplary embodiment each quick paging slot is 80 milliseconds (ms) in duration, while each full paging slot is 1.28 seconds. In the exemplary embodiment, a new full paging slot commences every 80 ms. Thus, in any 1.28 second period there are 16 full paging slots that partially overlap one another, and there are 16 quick paging slots that do not overlap each other. In the exemplary embodiment, quick paging slots are associated with full paging slots with the following one-to-one correspondence. Each quick paging slot that terminates is associated with the next full paging slot that commences after its termination.

To help clarify, please see FIG. 2. In FIG. 2, the top row is representative of the quick paging slots, each of an exemplary 80 ms duration, and wherein the next quick paging slot starts immediately after another finishes. The middle row, which can be referred to as the FPA slot cycle, is representative of a set of full paging slots that repeat on exemplary 1.28 second boundaries. The third row, which can be referred to as the FPB slot cycle, is representative of another set of full paging slots that repeat on exemplary 1.28 second boundaries. The timeline on the bottom shows that:

full paging slot FPA1 starts at 0.1 second (100 ms)
full paging slot FPB1 starts at 0.18 seconds (180 ms)
full paging slot FPA2 starts at 1.38 seconds (1380 ms)
full paging slot FPB2 starts at 1.46 seconds (1460 ms)
full paging slot FPA3 starts at 2.66 seconds (2660 ms)
full paging slot FPB3 starts at 2.74 seconds (2740 ms)

FIG. 2 also shows the time slots for various quick paging. In FIG. 2, at point 120, time 0, begins quick paging slot 1
at point 122, time 80 ms, quick paging slot 1 terminates
at point 124, time 160 ms, quick paging slot 2 terminates
at point 126, time 240 ms, quick paging slot 3 terminates
at point 130, time 1360 ms, quick paging slot 17 terminates
at point 132, time 1440 ms, quick paging slot 18 terminates
at point 140, time 2640 ms, quick paging slot 33 terminates
at point 142, time 2720 ms, quick paging slot 34 terminates Because quick paging slot 1 terminates at point 122 (time 80 ms), it is associated with FPA1, the next full paging slot to begin after time 80 ms. Likewise, because quick paging slot 2 terminates at point 124 (time 160 ms), it is associated with full paging slot FPB1, the next full paging slot to begin after time 160 ms. By the same reasoning, quick paging slot 17 is associated with full paging slot FPA2, and quick paging slot 18 is associated with full paging slot FPB2.

As can be seen in FIG. 2, there is a delta time between the termination of a quick paging slot and the commencement of the full paging slot with which it is associated. This delta time exists to allow the remote station time to switch from monitoring the uncoded quick paging channel to monitoring the highly encoded full paging channel. In cdma2000, and in the exemplary embodiment shown in FIG. 2, this delta is 20 ms. However, the delta can be a lower value (as low as a 0 ms delta) or a higher value in alternate embodiments.

Each quick paging slot contains indicator bits that are used to indicate to remote stations the remote stations for which a page will be transmitted. When an indicator bit is set for a particular remote station in a quick paging slot, a page message is subsequently transmitted during the full paging slot that is associated with that quick paging slot. For example, referring to FIG. 2, if indicator bits were set in quick paging slot 2 such that it indicated that a page would be sent to a particular remote station 10c (not shown), then a page would be transmitted to the IMSI of remote station 10c during full paging slot FPB1.

In an exemplary embodiment, there are 384 bits in each quick paging slot of 80 ms. Each quick paging slot is subdivided into a first 40-ms section and a second 40-ms section, each of 192 bits. For the purpose of redundancy, each bit transmitted as "on" in the first section has a corresponding bit transmitted as "on" in the second section. Likewise, each bit transmitted as "off" n the first section has a corresponding bit transmitted as "off" in the second section. The two corresponding bits are hereinafter referred to as bit-pairs. Each time a remote station is going to monitor a quick paging slot, the hash function of the remote station will take system time as one input and will yield a number representative of the incoming page bit indicator to monitor in the first 192 bits. The hashing function is also used to determine the other bit in the bit-pair that needs to be monitored in the second group of 192 bits. Put another way, a bit location X, in the first 192 bits, and a bit location Y, in the second 192 bits will be determined by each remote station for each quick paging slot that it monitors. The remote station can monitor bit X and bit Y on the quick paging slot to determine whether or not it should look for an incoming page on the full paging channel.

FIG. 3 is a representation of an exemplary quick paging channel slot of two sections. In the exemplary embodiment, each quick paging channel slot is 80 ms in duration and is comprised of 384 bits. In the exemplary embodiment, the quick paging channel slots are divided equally into two sections of 40 ms, each containing 192 bits. Although Quick Paging Slot (QPS) (see diagram) has a value of 384 in the exemplary embodiment, the value of QPS, as well as the duration of the quick paging slot, can take other values in alternate embodiments.

Point 210 is the location of the first bit in the first section of the quick paging slot. Point 214 is the location of the last bit in the first section of the quick paging slot. Point 212 is the location of a hashed bit location X, which is located somewhere in the first section of QPS/2 bits.

Point 220 is the location of the first bit in the second section of the quick paging slot. Point 224 is the location of the last bit in the second section of the quick paging slot. Point 222 is the location of a hashed bit location Y, which is located somewhere in the second section of QPS/2 bits. Both X and Y were determined using the same IMSI_S as an input, and therefor X and Y constitute a bit-pair of equivalent values. cdma2000 uses an instance of this embodiment, wherein an 80-ms slot contains 192 bit-pairs (QPS=384). Of the 192 bit-pairs, 2 bit-pairs, corresponding to the first two bits in each 40 ms section, are reserved for future use. The remaining 190 bit-pairs correspond to 190 unique hash values, and can be set to either on or off to indicate to remote stations whether or not to monitor a full paging channel slot associated with a quick paging channel slot. One skilled in the art would realize that other embodiments are available, such as embodiments that do not pair the bits for redundancy, and thus allow 384 bit locations to be uncorrelated with one another. Additionally, in alternate embodiments, more or fewer bits could be transmitted in quick paging slots of various durations.

In discussing quick paging slots and full paging slots, it should be noted that any given remote station is associated with exactly one cycle of full paging slots. A 'cycle' is a group of full paging slots that begin and end at substantially the same time. For instance, referring to FIG. 2, the second row (containing slots FPA1, FPA2, and FPA3) are one cycle of slots, while the third row (containing slots FPB1, FPB2, and FPB3) are another cycle of slots. These cycles are continuous.

Given that a remote station is only associated with one cycle of slots, it is efficient for a base station to only transmit indicator bits for a given remote station in the quick paging slots that terminate just prior to the transmission of the full paging slots with which a remote station is associated. It thus follows that any given remote station is associated only with the quick paging slots that terminate just prior to the commencement of each full paging slot in that remote station's slot cycle. For example, referring to FIG. 2, a remote station that is associated with the FPB slot cycle is associated with slots 2, 18, 34, and all other multiples of 2+16*K. Remote stations only need to monitor the quick paging slots with which they are associated.

As incorporated into the cdma2000 standard, the base station and the remote station use a hashing function to determine which indicator bits of the quick paging channel are to be associated with each individual remote station. Each remote station has a unique International Mobile Station Identifier (IMSI) assigned to it with which it registers to the base stations. The hashing function uses as one input IMSI_S (the short IMSI, which is the last 10 bits of the IMSI in cdma2000), and thus the hashing function has a unique input for each remote station. In cdma2000, the hashing function also uses system time as an input into the hash function. Thus, different indicator bits are set for a particular remote station depending on the time of transmission. The receiving remote station is able to use the same inputs to its hashing function such that it knows which indicator bits to examine in any particular quick paging slot.

By examining the indicator bits that the hash function yields, a remote station can tell by quickly looking at one or more indicator bits on the quick paging channel whether or not there will be a message directed to it in the next slot of the full paging channel. Because monitoring a small group of one or more indicator bits on a quick paging channel, which uses simple on-off keying (OOK), requires much less energy than monitoring a message of many bits on a highly encoded full paging channel, a remote station is able to conserve power when using a quick paging channel to monitor for pages. Thus remote stations are able to increase their standby time when using a quick paging channel to monitor for incoming pages.

Today, a large portion of databurst messages transmitted in commercial wireless telephone systems, are point-to-point databurst messages. As mentioned above, point-to-point databurst messages can be sent to remote stations by first transmitting an incoming page message in order to set up a transmission channel for the subsequent transmission of the databurst message. Thus, the use of the quick paging channel can increase standby time for remote stations configured to receive point-to-point databurst messages.

cdma2000 and its predecessors (the family of Telecommunication Industry Association (TIA) protocols known as IS-95, IS-95A, and IS-95B) also support broadcast databurst messages. Broadcast databurst messages, hereinafter referred to as broadcast messages, are databurst messages that are directed to a group of mobiles. An example of the contents of a broadcast databurst message, commonly called a broadcast SMS message by those skilled in the art, is a text message stating, "New call forwarding plans available; hit *611 to speak to a customer service representative for details." Although some broadcast messages may be sent to all subscribers, there are also means to send broadcast messages to various groups of remote stations based upon the preferences that each individual subscriber has. cdma2000 currently has reserved support for 2 16 categories of broadcast messages, a small subset of which is currently defined. These broadcast categories are discussed in the document), entitled "Short Message Service for Spread Spectrum Systems ANSI/TIA/EIA/IS-637A," published in September of 1999, incorporated herein by reference, wherein the broadcast categories are referred to as service categories.

Remote stations can be configured to receive only broadcast messages of the categories in which a particular subscriber is interested. For instance, if sports were a category, a given remote station would only receive broadcast messages of the sports category to which the remote station was subscribed. Likewise, if traffic was a category, a given remote station would only receive broadcast messages of the local traffic updates category to which the remote station was subscribed. "TRAFFIC REPORT: Highway 8 North backed up at Main Street due to accident. Expect a 40 minute delay," is an example of the text of broadcast message that is only directed to remote stations that have been configured to receive a category of broadcast messages that contain traffic information.

Although the method of monitoring a quick paging channel in cdma2000 allows a remote station to conserve power when attempting to monitor for a point-to-point databurst message by using the quick paging channel to monitor for incoming pages directed at its IMSI, this method does not work for the reception of broadcast messages. The reason it does not work for broadcast messages is that a broadcast message is not directed at the remote station of one subscriber, as is a point-to-point message, but is rather directed to all remote stations configured to receive broadcast messages of a particular category. As there is no correlation between the IMSIs or remote stations and the categories of broadcast messages to which they are configured to receive, another method was developed to receive broadcast messages.

Presently, a method has been developed to monitor for broadcast messages. The method uses the general page message (GPM). Besides containing incoming page notifications for individual remote stations, a GPM can contain a listing of broadcast message categories to be transmitted, the channels on which they are to be transmitted, and the time slots during which each one will be transmitted. Each indication of when and on what channel a particular category of broadcast message will be transmitted is hereinafter referred to as a broadcast pointer. In relation to a particular remote station configured to receive a set of one or more categories of broadcast messages, a broadcast pointer of interest is a broadcast pointer that references a category in the aforementioned set of categories. A remote station that is configured to receive broadcast messages will periodically monitor the GPM messages transmitted at the beginning of its full paging slots. Although the GPM messages are not diagrammed in FIG. 2, in an exemplary embodiment, the GPM are at the beginning of the full paging slots. In cdma2000A, the GPM messages are monitored within the first 80 ms of each full paging slot on the F-CCCH. Because of the methodology that the base station uses to transmit GPMs, the remote station need only monitor GPM messages during the first 80 ms of the remote station's full paging cycle. A remote station may be configured to monitor the GPM messages toward the beginning of every full page slot in its slot cycle, or it may be configured to monitor the GPM messages at the beginning of one out of every N full page slots. The more infrequently it monitors for GPMs with broadcast information, the less power the remote station expends. The broadcast slot cycle index is a numerical value that corresponds to the frequency with which a remote station monitors for GPMs with broadcast information. The higher a remote station's broadcast slot cycle index, the less frequently a remote station monitors for GPMs with broadcast information.

In cdma2000, the GPM messages are transmitted on the full paging channel and reference broadcast messages at a subsequent time slot on the same full paging channel. In cdma2000A, the GPM messages are transmitted on a F-CCCH, and reference broadcast messages at a subsequent time slot on a F-BCCH.

As many users do not need to receive broadcast messages right away, remote stations are often configured with a large broadcast slot cycle index. In such cases, the remote station doesn't monitor for GPMs with broadcasts very often, and thus conserves much battery power. In fact, as of present, there may be many remote stations configured not to receive broadcast messages altogether. However, with the information explosion, it is thought that more users will begin to demand to receive broadcast messages of various categories with very little delay. In such a situation, wherein a user would likely demand a small broadcast slot cycle index, the power consumption inefficiencies of the above broadcast method scheme will become apparent. What is needed is a method and apparatus for maximizing standby time in remote stations configured to receive broadcast databurst messages.

SUMMARY

The present invention is directed to a mobile radio communication system that includes a base station, a plurality of remote stations, a first channel on which general page messages containing paging information and broadcast databurst message references are periodically transmitted, and an auxiliary channel containing broadcast databurst notification indicators. The present invention is directed towards utilizing the auxiliary channel to increase standby time in remote stations that are configured to receive broadcast databurst messages.

The auxiliary channel in an exemplary embodiment is an uncoded, on-off keying (OOK) modulated direct sequence spread spectrum signal that is used by remote stations operating within the coverage areas of base station.

In an exemplary embodiment, the broadcast databurst notification indicators are one or more indicator bits set to indicate to a remote station whether it needs to examine the first channel for broadcast databurst message references. In one exemplary embodiment, the indicator bit locations are determined by using a hashing function.

In an exemplary embodiment, a quick paging channel is used as the auxiliary channel, wherein broadcast databurst notification indicators are multiplexed onto a quick paging channel along with incoming page notification indicators. In another exemplary embodiment, a new channel is used as the auxiliary channel for the transmission of the broadcast databurst notification indicators. In one exemplary embodiment, an F-CCCH is used as the first channel.

BRIEF DESCRIPTION OF THE DRAWINGS

The features, objects, and advantages of the present invention will become more apparent from the detailed description set forth below when taken in conjunction with the drawings in which like reference characters identify like features correspondingly throughout:

FIG. 2 is a timing diagram illustrating the timing of slots in a quick paging channel and a full paging channel;

FIG. 3 is a schematic representation of an exemplary embodiment of a quick paging slot of two sections;

FIG. 4 is a schematic representation of N broadcast category indicator bits to be transmitted on an auxiliary channel of the present invention.

FIG. 5 is a schematic representation of a modified quick paging channel slot of the present invention;

DETAILED DESCRIPTION

As described above, general page messages are transmitted on highly encoded channels, and can be used to indicate to remote stations on which channels and at what time slots broadcast messages of particular categories will be transmitted via broadcast pointers. In relation to a particular remote station configured to receive a set of one or more categories of broadcast messages, a broadcast pointer of interest is a broadcast pointer that references a category in the aforementioned set of categories. As broadcast pointers are lengthy, and as they are transmitted on a highly encoded channel that uses convolutional encoding to ensure integrity, a remote station consumes a considerable amount of power each time it monitors for a broadcast pointer of interest. The method of the present invention uses indicator bits on an uncoded channel in conjunction with broadcast pointers to conserve power in a remote station.

Figure 1:
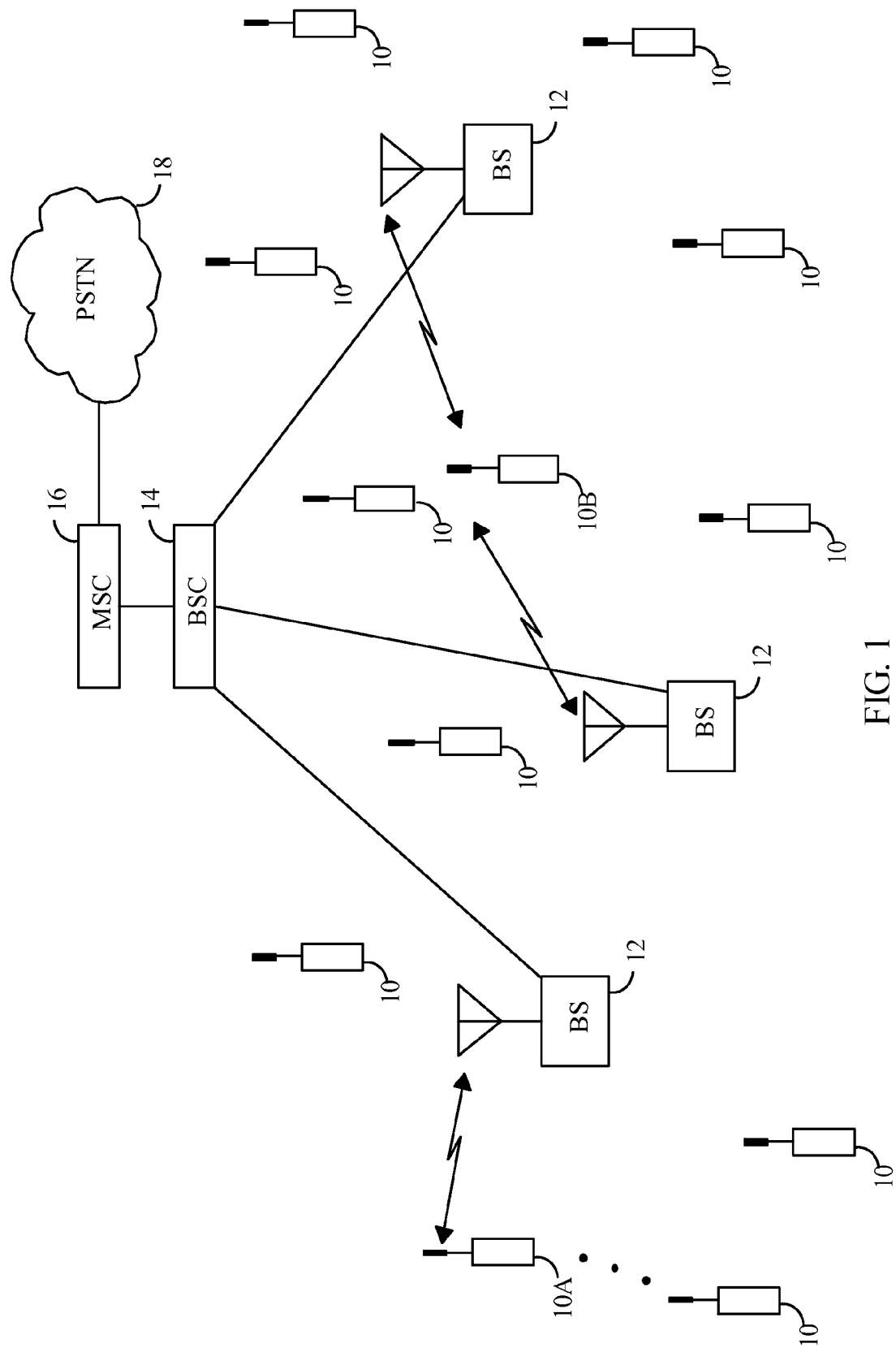
FIG. 1 is a block diagram of a cellular telephone system.
Figure 6:
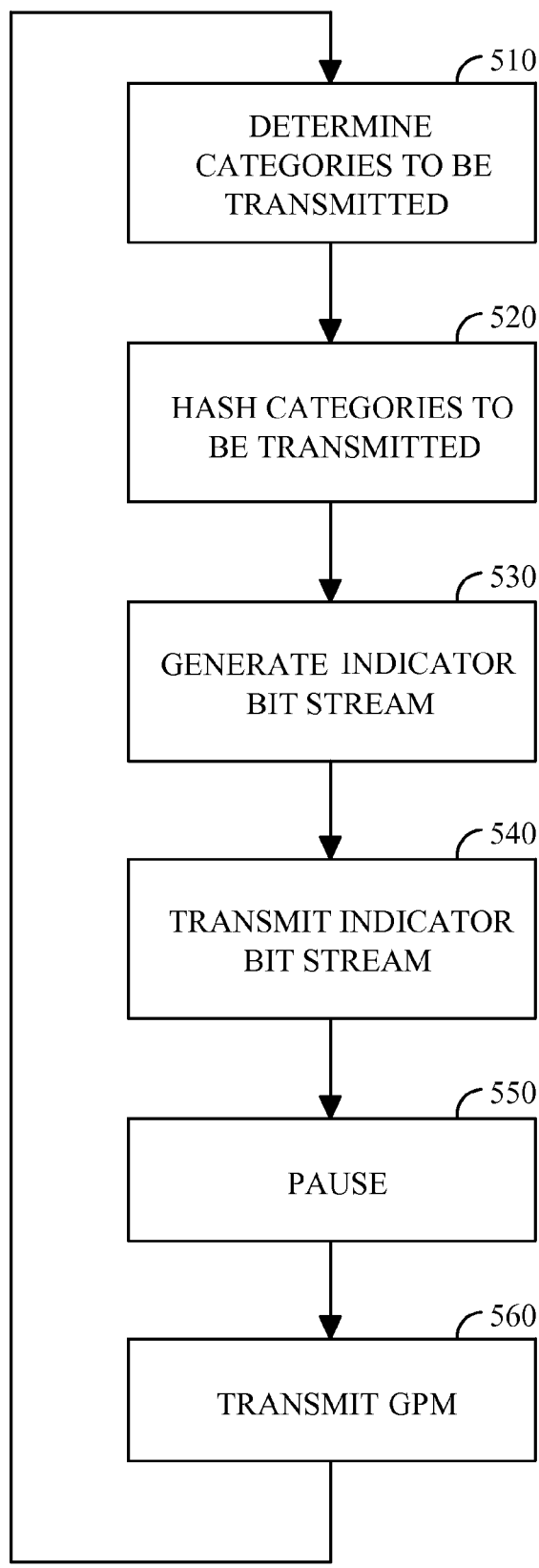
FIG. 6 is a basic flow chart of a method used by a base station of the present invention to transmit broadcast category notifications.

FIG. 6 is a basic flow chart of a method used by a base station of the present invention to transmit broadcast category notifications. In block 510, a base station determines the categories of broadcast messages to be transmitted at time slots t1 through tX. The process then proceeds to block 520.

In block 520, the base station supplies the determined categories to a pre-defined hashing function. The hashing function produces output that corresponds to one or more bits from a set of N bits, wherein N is a pre-determined value. In an exemplary embodiment, N is 8 and the hashing function produces a bit index of a value between 0 and 7. Alternate embodiments could use different values for N. In an exemplary embodiment, only the categories of broadcasts are used for hashing. As is known to one skilled the art, a hash such as this can be implemented with a simple table lookup. In an alternate embodiment, system time is additionally used as an input to the hash function. In such an embodiment, the output of the hash function for any given category can produce a different output at two different system times. The process then moves to block 530.

In block 530, the base station generates the broadcast indicator bit stream of the present invention. The broadcast indicator bit stream is made up of N bits, in which the bits corresponding to the output of the hashing function described in block 520 are set to an "on" value. All other bits in the broadcast indicator bit stream are set to "off." This becomes more clear with an example.

For purposes of an example, let us assume that in a particular exemplary embodiment, the leftmost bit is referred to as bit N−1, the rightmost bit is referred to as bit 0, N is 8, a bit value of 0 means "off," and a bit value of 1 means "on." In such a case, a bit stream of the 8 bits 00000000 means that no categories of broadcasts will be transmitted during time slots t1 through tX. Likewise, a bit stream of 00001001 means that categories that hashed to an index value of 0 and categories that hashed to an index value of 3 will be transmitted during time slots t1 through tX.

Although steps 520 and 530 are diagrammed as separate steps that occur in a sequential order, wherein all categories are hashed and then all corresponding bits are set, one skilled in the art will appreciate that the steps do not need to occur in mutually exclusive fashion. For instance, in an exemplary embodiment, one category of the categories to be transmitted could be hashed, after which the corresponding bit in the broadcast indicator bit stream is set. Then, a second category of the categories could be hashed, after which the broadcast indicator bit stream could be modified to also have the corresponding bit from the latest hash set.

The process then proceeds to block 540. In block 540 the broadcast indicator bit stream set in block 530 is transmitted. In an exemplary embodiment the bit stream is transmitted on an auxiliary channel that is an uncoded, on-off keying (OOK) modulated direct sequence spread spectrum signal used by remote stations operating within the coverage areas of a base station. The base station uses the auxiliary channel to inform remote stations whether or not they should monitor a particular GPM message for broadcast pointers of certain categories.

FIG. 4 is a schematic of N broadcast category indicator bits to be transmitted on an auxiliary channel of the present invention, and which bits are representative of the bit stream to be transmitted in block 540. In FIG. 4, point 410 is the first bit in the broadcast indicator bit stream. Point 414 is the location of the Nth bit in the broadcast bit stream. Point 412 is the location of the Xth bit in the broadcast indicator bit stream, located within the N bits of the bit stream. In an exemplary embodiment, the auxiliary channel and a conventional quick paging channel are transmitted at the same time, with the auxiliary channel slots substantially time-aligned with the slots on a conventional quick paging channel. In such an embodiment, the bits on the auxiliary channel are transmitted utilizing a different Walsh code than are the bits transmitted on the quick paging channel.

In another exemplary embodiment, the broadcast indicator bit stream is transmitted on a modified version of a conventional quick paging channel slot. This modified quick paging channel slot is diagrammed in FIG. 5. Wherein a conventional quick paging channel has slots of length QPS and is divided into two sections, as is described in reference to FIG. 3, the quick paging channel of an exemplary embodiment of the present invention is divided into three sections, as is shown in FIG. 5. As shown in FIG. 5, the quick paging channel slot is comprised of QPS bits, wherein the first N bits of the quick paging slot comprise the broadcast indicator bit stream of the present invention. The second section and the third section of the modified quick paging channel contain the incoming page hash bits based on an IMSI_S as is present in the prior art. The two hash sections of FIG. 5 differ from the prior art in length, however. Whereas an existing quick paging channel slot is comprised of two sections of QPS/2 bits for incoming page indicator bits, the slots of the modified quick paging channel of the present invention have two sections of (QPS-N)/2 indicator bits. For instance, if a prior art system had a quick paging slot of 80 ms, a QPS of 384, wherein the incoming page indicator bits were divided into two sections of 192 bits each, then one could create a modified quick paging channel of the present invention with a value of N=8, wherein the incoming page indicator bits would be divided into two sections of 188 bits. As such, the incoming page hashing function of the modified quick paging channel should have an output space that is smaller by 4 bits (192-188) than the output space of the hashing function of the prior art. Although the N bits of the broadcast indicator bit stream are at the beginning of the modified quick paging slot in this exemplary embodiment, the invention herein is not limited to such a placement. One skilled in the art will appreciate that the bits can be located in other portions of the modified quick paging channel, such as the last N bits, in alternate embodiments.

In an alternate exemplary embodiment, the broadcast indicator bit stream is redundantly transmitted for the same reasons that the paging indicator bits are redundantly transmitted. In one such exemplary embodiment, each bit of the N bits of the broadcast indicator bit stream is a portion of a bit-pair, wherein there is another corresponding bit set to the same value in the latter half of the modified quick paging channel. A modified quick paging channel of this exemplary embodiment would have N broadcast indicator bits followed by (QPS-2N)/2 incoming page indicator bits, followed by N redundant broadcast indicator bits followed by (QPS-2N)/2 redundant incoming page indicator bits.

In yet another alternate exemplary embodiment, the broadcast indicator bits can be overlaid a top of the paging indicator bits. For instance, on the modified quick paging channel, for any one bit (or bit-pair in a redundant scenario) that is transmitted as "on" in the overlay embodiment signals to a remote station, there is an impending incoming page for a remote station having an IMSI_S that hashes to this particular bit, or there is an impending broadcast pointer of a category that hashes to this particular bit.

Figure 8:
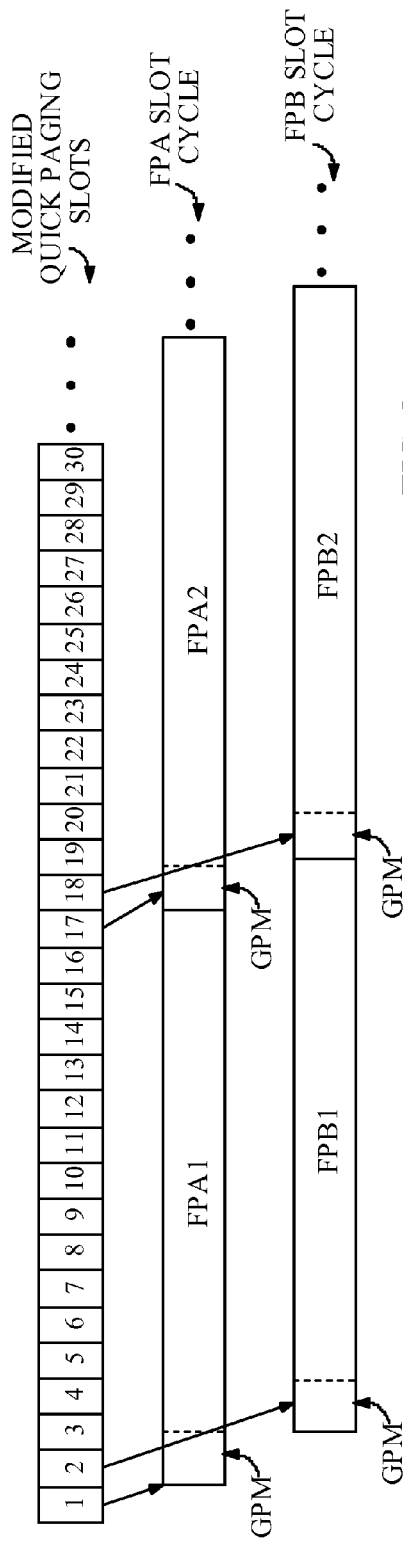
FIG. 8 is a diagram of the time relationship and association between the modified quick paging slots to the GPMs with which they are associated.

FIG. 8 is a diagram of the time relationship and association between the modified quick paging slots to the GPMs with which they are associated. In FIG. 8, it is seen that the modified quick paging slots, which include the broadcast bit indicator stream, are associated with the GPMs that occur toward the beginning of the next full paging slot transmitted.

Figure 9:
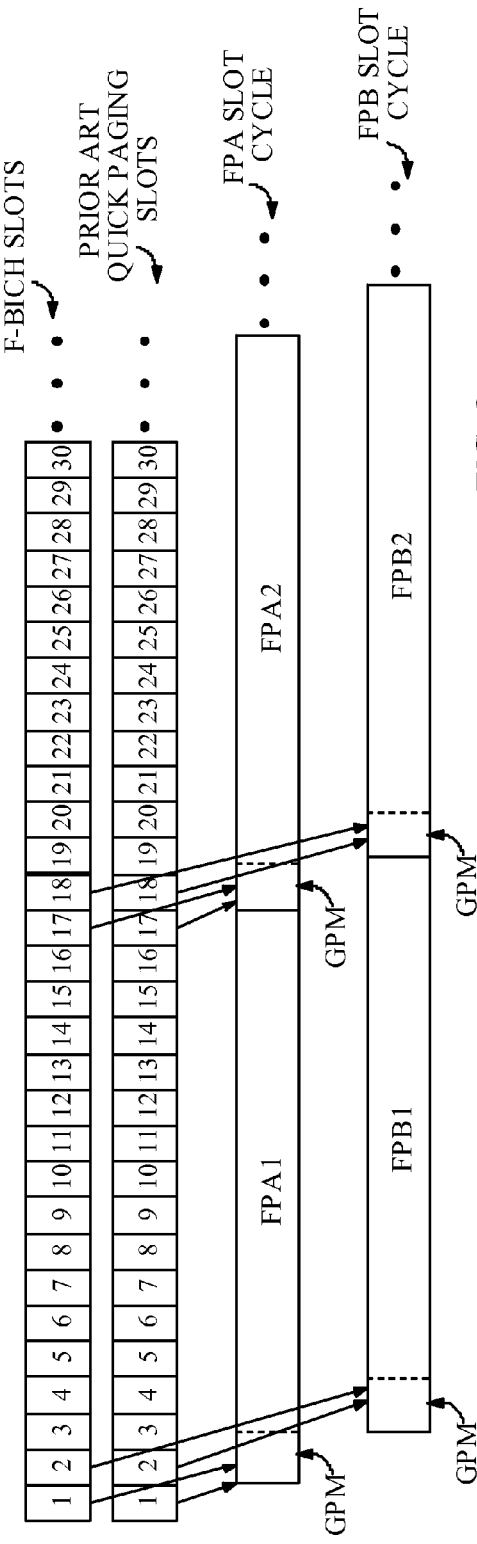
FIG. 9 is a diagram of the time relationship and association between the conventional quick paging slots and the new forward broadcast indicator channel slots of the present invention to the GPMs with which they are associated.

In an alternate exemplary embodiment, the quick paging channel of the present invention remains unchanged from the prior art. In this embodiment, the quick paging channel slots are the same as in FIG. 3. In this embodiment of the present invention, the broadcast indicator bit stream is transmitted on a separate channel, hereinafter called the Forward Broadcast Indicator Channel (F-BICH). The F-BICH uses its own dedicated Walsh code for transmission and is divided up into slots of the same length and duration as the quick paging channel slots. The first N bits of each slot of the F-BICH need be used to carry the broadcast indicator bit stream. Any remaining bits may be reserved for future uses. FIG. 9 is a diagram of the time relationship and association between the conventional quick paging slots and the new F-BICH slots to the GPMs with which they are associated. In FIG. 9, it is seen that the F-BICH slots coincide with the transmission of the quick paging slots. Additionally, it is seen that the F-BICH slots are associated with the same GPMs as are those of the conventional quick paging slots, namely the GPMs that occur toward the beginning of the next full paging slot transmitted.

Returning to block 540, the process then proceeds to block 550. In block 550, the base station waits for a pre-determined amount of time before moving to block 560. The amount of time needed is enough to allow a remote station to switch from monitoring the channel carrying the broadcast indicator bit stream to decoding the messages on the channel carrying the broadcast messages. In an exemplary embodiment, the wait time is 20 ms. However, the wait time can be more time or less time in alternate embodiments. The process then moves to block 560.

In block 560 general page messages are transmitted. These are transmitted on a full paging channel. In an embodiment for cdma2000A, the general page messages are transmitted on the F-CCCH. The general page messages, which contain the broadcast pointers, are transmitted in the same manner as in the prior art. It should be noted that the categories of broadcasts supplied to the hashing function of block 520 are the same categories that are used to generate the GPM messages at this time slot. Put another way, all categories present in the broadcast pointers of the GPM messages transmitted in block 560 were used as input to the hashing function of block 520. As an example, if a category of Sports was referenced in a broadcast pointer found in a GPM message transmitted in block 560, and if a category of Sports yields a bit index of three in the hashing function of block 520, then the broadcast indicator bit stream of block 540 would have the third bit set to "on." Thus, the broadcast indicator bit stream of block 540 has a correlation to the broadcast pointers present in the GPM messages transmitted in block 560.

After block 560, the process moves back to block 510 where the same process is performed for the set of categories to be transmitted at time slots t2 through tX+1.

Figure 7:
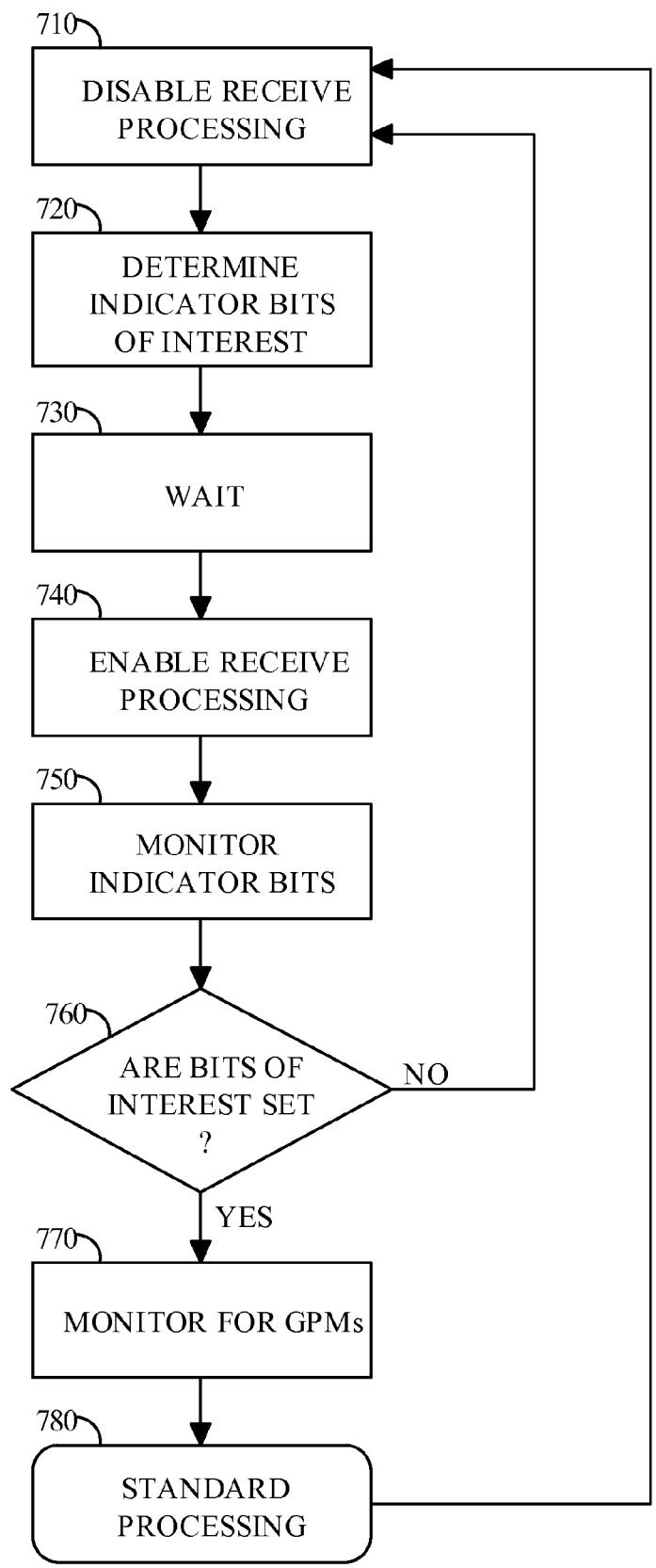
FIG. 7 is a basic flow chart of a method used by a remote station of the present invention to receive broadcast category notifications.

FIG. 7 is a basic flow chart of a method used by a remote station of the present invention to receive broadcast category notifications. In block 710, a remote station disables a portion of its RF unit, as the remote station is currently in a slotted sleep mode, wherein it does not need to enable portions of the RF unit to monitor any of the wireless channels until a predetermined amount of time passes. In some embodiments, other portions of the remote station may be disabled as well when the remote station is in a slotted sleep mode. The process then moves to block 720.

In block 720, the remote station determines the location of the broadcast indicator bits it needs to monitor by taking the categories the remote station is configured to receive and using them as input to a hashing function that yields the same output as the hashing function utilized by the base station in block 520. Additionally, in an exemplary embodiment, the remote station also determines the incoming page indicator bits for which it should monitor. The process then moves to block 730, wherein the remote station waits until a pre-determined time before it needs to enable the RF unit to successfully monitor the aforementioned indicator bits. The process then moves to block 740.

In block 740, the portion of the RF unit needed to monitor for indicator bits are turned on. Any other portions of the remote station that may need to be enabled to process the reception of indicator bits are also turned on. The process then moves to block 750.

In an exemplary embodiment, the broadcast indicator bit stream is received on a modified version of a conventional quick paging channel slot. This embodiment of transmission is described in reference to FIG. 5. In such an embodiment, in block 750 the broadcast indicator bits determined in block 720 are monitored selectively from the first N bits of the modified quick paging channel slot. Additionally, if the remote station is monitoring for incoming pages during the current quick paging channel slot, then in block 750 the incoming page indicator bits determined in block 720 are monitored selectively from the bits post after the first N bits of the modified quick paging channel slot. In such a case, it should be noted that the incoming page hashing function of the modified quick paging channel should have a smaller output than the hashing function of the prior art. Although the N bits of the broadcast indicator bit stream are at the beginning of the modified quick paging slot in this exemplary embodiment, the invention herein is not limited to such a placement. One skilled in the art will appreciate that the bits can be located in other portions of the modified quick paging channel, such as the last N bits, in alternate embodiments.

In an alternate exemplary embodiment, the broadcast indicator bit stream is redundantly transmitted for the same reasons that the paging indicator bits are redundantly transmitted. In one such exemplary embodiment, each bit of the N bits of the broadcast indicator bit stream is a portion of a bit-pair, wherein there is another corresponding bit set to the same value latter half of the modified quick paging channel.

In yet another alternate exemplary embodiment, the broadcast indicator bits can be overlaid at the top of the paging indicator bits. For instance, on the modified quick paging channel, for any one bit (or bit-pair in a redundant scenario) that is transmitted as "on" in the overlay embodiment signals to a remote station, there is either an impending incoming page for a remote station having an IMSI_S that hashes to this particular bit, or there is an impending broadcast pointer of a category that hashes to this particular bit.

In an alternate exemplary embodiment, the quick paging channel is unmodified, and the broadcast indicator bits are transmitted on the F-BICH of the present invention. This alternate embodiment of transmission is also described in reference to FIG. 5. In such an embodiment, in block 750 the broadcast indicator bits determined in block 720 are monitored selectively from the first N bits of the F-BICH slot. Additionally, if the remote station is monitoring for incoming pages during the current quick paging channel slot, then in block 750, the incoming page indicator bits determined in block 720 are monitored selectively from the conventional quick paging channel slot.

The process then moves to block 760. In block 760, it is checked whether any of the monitored bits were set to "on."

If none of the monitored indicator bits were set, then the base station has conveyed to the remote station with these few bits that there is no need for it to monitor the GPMs during the next full page slot. In such a case, the remote station returns to step 710 so that it can quickly go back to its slotted sleep mode.

In an exemplary embodiment, one or more of the monitored indicator bits were set to "on," then the process moves to block 770. In one embodiment, if a bit is a member of a bit-pair (done for redundancy in prior art), it is not monitored as being "on" unless the other bit in the bit-pair is also received as being "on." In block 770, GPMs are monitored in the same manner as is done in prior art. In cdma2000, they are monitored on the full paging channel. In cdma2000A they are monitored on the F-CCCH. The process then moves to block 780.

In block 780, standard processing is performed dependent upon the contents of the GPMs monitored. The standard processing is done in accordance with conventional processing based upon the receipt of GPM messages. For instance, if an incoming page is received, the remote station will process it accordingly. In such an instance, the processing could involve opening a dedicated communication link with a base station (and subsequently closing it) before eventually returning to slotted sleep mode and returning to block 710. In another example, if a GPM message with a broadcast pointer to a message of interest was received, the remote station would monitor the appropriate channel at the appropriate time based upon the contents of the broadcast pointer. In another example, the GPM may not contain any messages of interest, and therefore, the remote station has no standard processing other than recognizing that there are no messages of interest to it.

The process returns to block 710 after the completion of the standard processing of block 780.

Figure 10:
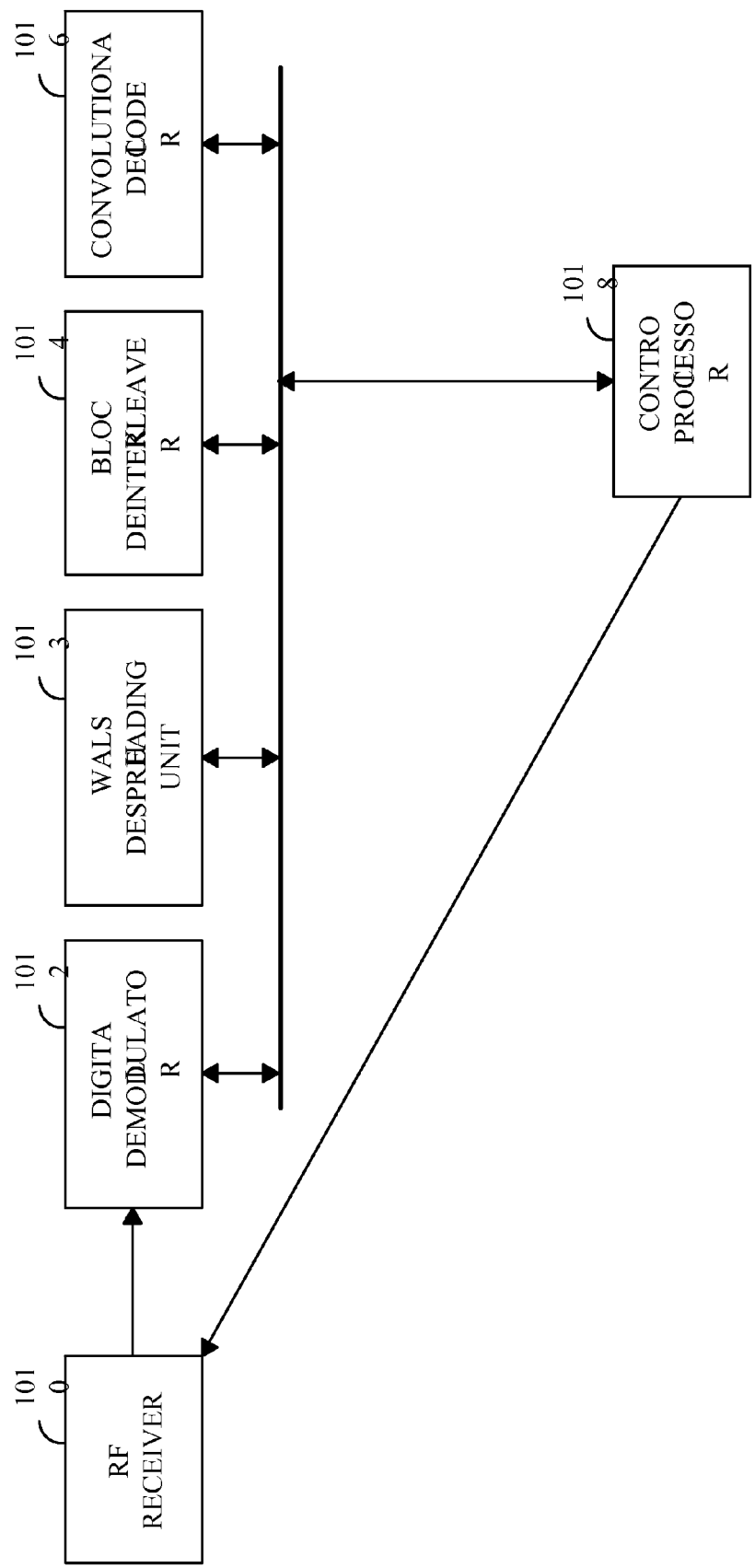
FIG. 10 is a block diagram showing a simplified illustration of a remote station configured in accordance with one embodiment of the present invention.

FIG. 10 is a block diagram showing a simplified illustration of remote station 10 configured in accordance with one embodiment of the invention. Digital demodulator 1012, Walsh despreading unit 1013, block deinterleaver 1014, convolutional decoder 1016 and control processor 1018 are coupled via a digital bus, and RF receiver 1010 is coupled to digital demodulator 1012. During slotted sleep mode, the control processor 1018 periodically activates RF receiver 1010 and digital demodulator 1012 to process either a) a modified quick paging channel or b) both a conventional quick paging channel and an F-BICH, depending on the method of the present invention chosen. The RF receiver 1010 downconverts and digitizes RF signals, and digital demodulator 1012 performs digital demodulation for a first duration using PN despreading techniques known in the art. The digitally demodulated data is passed to Walsh despreading unit 1013. In an embodiment in which a modified quick paging channel of the present invention is utilized, Walsh despreading unit 1013 multiplies the demodulated data by a Walsh code corresponding to the modified quick paging channel Walsh code and provides the output to control processor 1018. In an embodiment in which a conventional quick paging channel is used in conjunction with an F-BICH of the present invention, Walsh despreading unit 1013 multiplies the demodulated data both against a Walsh code of the quick paging channel and against a Walsh code of the F-BICH. In such a case, the output from both Walsh output streams are provided to control processor 1018. In either case, both broadcast category indicator bits and paging indicator bits are provided to control processor 1018. Control processor 1018 examines the broadcast indicator bit stream to determine whether it needs to monitor GPMs either for a broadcast pointer of interest. Additionally, control processor 1018 can monitor the incoming page indicator bits to determine if it needs to monitor GPMs for an incoming page. Control system 1018 will decide to monitor GPMs at the next full paging slot if the incoming page indicator bits or the broadcast indicator bit stream should monitor these GPMs for messages of interest. Additionally, in an exemplary embodiment, if the signal has been received with poor quality, determinable by many conventional methods such as examining the signal strength of the pilot, control system 1018 may decide to monitor the GPMs regardless of the bit stream contents.

In the event that control system 1018 decides to monitor these GPMs, it activates block deinterleaver 1014 and convolutional decoder 1016 to begin processing the full paging channel (the F-CCCH in cdma2000A) for a second duration that is longer than the first duration. Control system 1018 then monitors the data received over the full paging channel for GPM messages that are of interest to it. At this point, standard processing of the GPM messages is performed (block 780 in FIG. 7). After the standard processing of the message is complete, control system 1018 deactivates block deinterleaver 1014 and convolutional decoder 1016 and returns to the slotted sleep mode. Additionally, in an exemplary embodiment, the synthesizer of RF receiver 1010 is deactivated as well.

One skilled in the art will recognize that control processor 600 may be implemented using field-programmable gate arrays (FPGA), programmable logic devices (PLD), digital signal processors (DSP), one or more microprocessors, application specific integrated circuits (ASIC) or other devices capable of performing the functions described above.

As should be apparent from the description provided above, the present invention allows a remote station 10 to consume less power when monitoring for broadcast messages during slotted sleep mode when using a broadcast indicator bit stream.

Consuming less power in slotted sleep mode allows remote station 10 to operate longer on a battery charge, and therefore extends the standby time of remote station 10. Since remote stations 10 are typically used in mobile telecommunications, it is often necessary to go extended periods of time without recharging or replacing the battery of remote station 10. Thus, in order to provide increased convenience, and to reduce the likelihood of missing broadcast messages due to battery depletion, extending the standby time for a given battery size is highly desirable.

Figure 11:
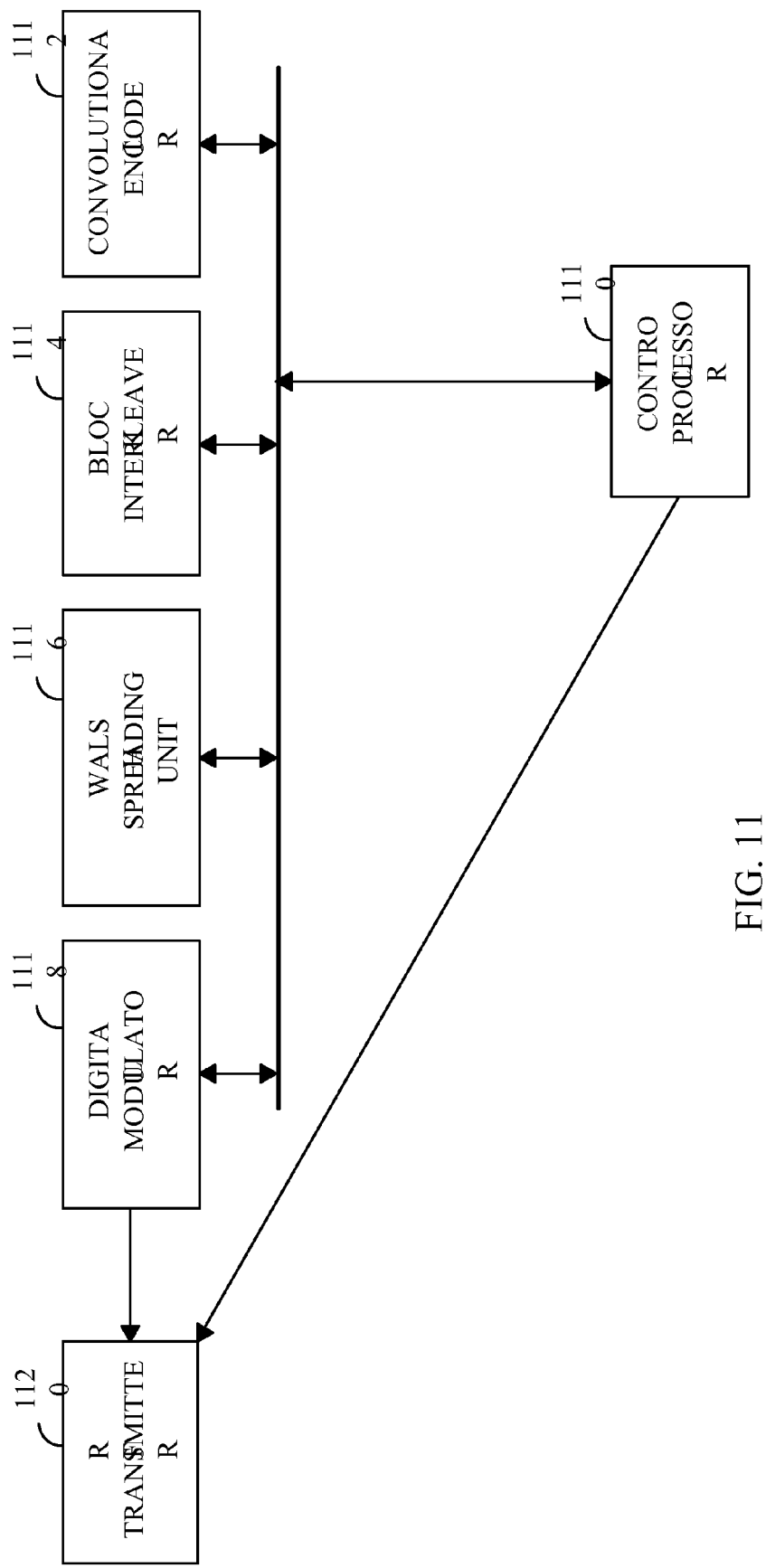
FIG. 11 is a block diagram showing a simplified illustration of a base station configured in accordance with one embodiment of the present invention.

FIG. 11 is a block diagram showing a simplified illustration of base station 12 configured in accordance with one embodiment of the invention. Digital modulator 1118, Walsh spreading unit 1116, block interleaver 1114, convolutional encoder 1112 and control processor 1110 are coupled via a digital bus, and RF transmitter 1120 is coupled to digital modulator 1118.

At a time prior to time slot t1, control processor 1110 determines the categories of broadcast messages to be transmitted at time slots t1 through tX. Control processor 1110 performs a hashing function on these categories, which produces outputs corresponding to one or more bits from a set of N bits, wherein N is a pre-determined value. Control processor 1110 then generates a broadcast indicator bit stream made up of N bits, in which the bits corresponding to the output of the hashing function are set to an "on" value. All other bits in the broadcast bit stream are set to "off." In one exemplary embodiment, "on" bits have a value of one while "off" bits have a value of 0. This indicator bit stream is provided to Walsh spreader 1116.

In an embodiment in which a modified quick paging channel of the present invention is utilized, Walsh spreading unit 1116 multiplies the supplied bit stream by a Walsh code corresponding to the modified quick paging channel, and provides this to digital modulator 1118.

In an embodiment in which a conventional quick paging channel is used in conjunction with an F-BICH of the present invention, control processor 1110 supplies a bit stream of paging indicator bits to Walsh spreading unit 1116 at substantially the same time as it provided the broadcast indicator bit stream to Walsh spreading unit 1116. In such an embodiment, Walsh spreading unit 1116 multiplies the supplied broadcast indicator bit stream by a Walsh code corresponding to the F-BICH of the present invention, and it multiplies the supplied paging indicator bit stream by a Walsh code corresponding to the quick paging channel. Walsh spreading unit 1116 then combines the two outputs of the separate multiplication operations, and then supplies the combined output to digital modulator 1118. Digital modulator 1118 performs digital modulation on the output of Walsh spreading unit 1116 for a first duration, using PN spreading techniques known in the art, and provides the modulated signal to RF transmitter 1120, where the signal is upconverted and transmitted wirelessly.

In an embodiment in which a modified quick paging channel of the present invention is utilized, control processor 1110 provides an incoming page indicator bit stream to Walsh spreading unit 1116 after it provides the broadcast indicator bit stream to Walsh spreading unit 1116. In such an embodiment, Walsh spreading unit 1116 multiplies the supplied incoming page indicator bit stream by a Walsh code corresponding to the modified quick paging channel, and provides this to digital modulator 1118. Digital modulator 1118 performs digital modulation on the output of Walsh spreading unit 1116 for a first duration, using PN spreading techniques known in the art, and provides the modulated signal to RF transmitter 1120, where the signal is upconverted and transmitted wirelessly. In this embodiment, the flow of signals through the system is such that the transmitted signal is representative of the broadcast indicator bits followed by the incoming page indicator bits on the same Walsh channel.

At a subsequent time, control processor 1110 generates general page messages containing broadcast pointers corresponding to the broadcast categories supplied to the hashing function discussed above. The broadcast pointers reference broadcast messages that will be subsequently transmitted between the time slots of t1 and tX. Additionally, control processor 1110 generates incoming page messages corresponding to the incoming page indicator bits generated earlier. The page messages are supplied to convolutional encoder 1112 where they are converted into a convolutionally encoded bit stream to provide for error correction. Convolutional encoder 1112 provides the convolutionally encoded bit stream to block interleaver 1114, where the bits are interleaved or rearranged. The interleaved bit stream is provided to Walsh spreading unit 1116 wherein the bit stream is multiplied by a Walsh code corresponding to a full paging channel (the F-CCCH in cdma2000), and is provided to digital modulator 1118. Digital modulator 1118 performs digital modulation on this bit stream for a second duration, wherein said second duration is longer than said first duration, using PN spreading techniques known in the art. Digital modulator 1118 provides the modulated signal to RF transmitter 1120, where the signal is upconverted and transmitted wirelessly.

The methods and techniques disclosed herein may be used in conjunction with several alternate modulation techniques, including TDMA, WCDMA, and EDGE without departing from the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for receiving broadcast messages in a spread spectrum telecommunications system for maximizing standby time in remote stations configured to receive the broadcast messages, the method comprising:
   associating broadcast message categories with bit indices of a broadcast indicator bit stream by hashing desirable said broadcast message categories via a pre-determined hashing function to determine said bit indices;
   receiving one or more broadcast indicator bits of the broadcast indicator bit stream on a modified quick paging channel that includes a plurality of quick paging slots;
   receiving one or more incoming page indicator bits on the modified quick paging channel;
   comparing each of said one or more broadcast indicator bits and each of the one or more incoming page indicator bits to an on or off value; and
   determining from said comparison whether to subsequently receive and decode an encoded bit stream that follows said broadcast indicator bit stream by a predetermined time interval,
wherein said modified quick paging channel comprises a first section of N said broadcast indicator bits, a second section of (QPS-2N)/2 said incoming page indicator bits, and a third section of (QPS-2N)/2 said incoming page indicator bits, where QPS equals the total number of bits in one quick paging slot, wherein N is a predetermined value.

2. The method of claim 1 wherein said third section of said incoming page indicator bits comprises bit pairs with the second section of incoming page indicator bits.

3. The method of claim 1 wherein said first section of N said broadcast indicator bits comprises first and second sets of said broadcast indicator bits, with each set having N/2 said broadcast indicator bits.

4. The method of claim 1 wherein the first section of N said broadcast indicator bits includes two mutually redundant sets of the broadcast indicator bits.

5. The method of claim 1, wherein the step of receiving said one or more broadcast indicator bits on said modified quick paging channel comprises the step of demodulating a corresponding uncoded, on-off keying modulated direct sequence spread spectrum signal.

6. The method of claim 5 wherein said first section of N said broadcast indicator bits comprises first and second sets of said broadcast indicator bits, with each set having N/2 said broadcast indicator bits and wherein pairs of corresponding said broadcast indicator bits from said first and second sets are monitored together.

7. The method of claim 1, wherein the step of receiving said one or more broadcast indicator bits comprises the step of demodulating a corresponding signal on the modified quick paging channel.

8. The method of claim 7, wherein the step of receiving the one or more incoming page indicator bits comprises the step of demodulating a corresponding signal on said modified quick paging channel after demodulating said corresponding signal to said one or more broadcast indicator bits.

9. The method of claims 1 further comprising:
waking up on a periodic basis to receive said one or more broadcast indicator bits in the broadcast indicator bit stream located at said bit indices.

10. A method for transmitting broadcast messages in a spread spectrum telecommunications system for maximizing standby time in remote stations configured to receive the broadcast messages, the method comprising:
determining broadcast message categories to be transmitted in predetermined time slots;
providing the determined broadcast message categories to a pre-defined hashing function to generate a hashing function output corresponding to one or more broadcast indicator bits from a set of N broadcast indicator bits, wherein N is a pre-determined value;
generating an N-bit broadcast indicator bit stream based on the hashing function output, wherein the broadcast indicator bits in the broadcast indicator bit stream corresponding to the hashing function output are set to an on value and all other said broadcast indicator bits in the broadcast indicator bit stream are set to an off value;
transmitting the broadcast indicator bit stream; and
transmitting at a predetermined time slot subsequent to transmitting the broadcast indicator bit stream one or more general paging messages comprising one or more broadcast pointers corresponding to said broadcast message categories.

11. The method of claim 10 wherein system time is additionally used as an input to the pre-defined hashing function.

12. The method of claim 10 wherein the broadcast indicator bit stream is transmitted on an auxiliary channel as an uncoded, on-off keying (OOK) modulated direct sequence spread spectrum signal.

13. The method of claim 12 wherein the auxiliary channel and a quick paging channel are transmitted at the same time, with slots of the auxiliary channel substantially time-aligned with slots of the quick paging channel.

14. The method of claim 10 wherein said broadcast indicator bit stream is transmitted on a modified quick paging channel that includes a plurality of quick paging slots, and further comprising transmitting one or more incoming page indicator bits on the modified quick paging channel;
wherein said modified quick paging channel comprises a first section of N said broadcast indicator bits, a second section of (QPS-2N)/2 said incoming page indicator bits, and a third section of (QPS-2N)/2 said incoming page indicator bits, where QPS equals the total number of bits in one quick paging slot.

15. The method of claim 14 wherein said first section of N said broadcast indicator bits comprises first and second sets of said broadcast indicator bits, with each set having N/2 said broadcast indicator bits and wherein pairs of corresponding said broadcast indicator bits from said first and second sets are mutually redundant bits.

16. The method of claim 10, wherein said broadcast indicator bit stream is overlaid with one or more incoming page indicator bits on a modified quick paging channel.

17. An apparatus for receiving broadcast messages in a spread spectrum telecommunications system for maximizing standby time in remote stations configured to receive the broadcast messages, the apparatus comprising:
means for associating broadcast message categories with bit indices of a broadcast indicator bit stream by hashing desirable said broadcast message categories via a predetermined hashing function to determine said bit indices, said hashing function having system time as an input;
means for receiving one or more broadcast indicator bits of the broadcast indicator bit stream on a modified quick paging channel;
means for receiving one or more incoming page indicator bits on said modified quick paging channel;
means for comparing each of said one or more broadcast indicator bits and each of said one or more incoming page indicator bits to an on or off value; and
means for determining from said comparison whether or not to subsequently receive and decode an encoded bit stream that follows said broadcast indicator bit stream by a pre-determined time interval.

18. The apparatus of claim 17 wherein the means for receiving said one or more broadcast indictor bits comprises means for demodulating a corresponding uncoded, on-off keying modulated direct sequence spread spectrum signal.

19. The apparatus of claim 17 wherein said one or more incoming page indicator bits are received after receiving said one or more broadcast indicator bits.

20. The apparatus of claim 19 wherein the means for receiving said one or more broadcast indicator bits comprises means for demodulating a corresponding signal on the modified quick paging channel.

21. The apparatus of claim 20 wherein said modified quick paging channel has a plurality of quick paging slots and comprises a first section of N said broadcast indicator bits, a second section of (QPS-2N)/2 said incoming page indicator bits, and a third section of (QPS-2N)/2 said incoming page indicator bits, where QPS equals the total number of bits in one quick paging slot.

22. The apparatus of claim 17 wherein said one or more broadcast indicator bits are overlaid with said one or more incoming page indicator bits on said modified quick paging channel.

23. Apparatus for transmitting broadcast messages in a spread spectrum telecommunications system for maximizing standby time in remote stations configured to receive the broadcast messages, the apparatus comprising:
means for determining broadcast message categories to be transmitted in predetermined time slots;
means for providing the determined broadcast message categories to a pre-defined hashing function to generate a hashing function output corresponding to one or more broadcast indicator bits from a set of N broadcast indicator bits, wherein N is a pre-determined value;
means for generating an N-bit broadcast indicator bit stream based on the hashing function output, wherein the broadcast indicator bits in the broadcast indicator bit stream corresponding to the hashing function output are set to an on value and all other said broadcast indicator bits in the broadcast indicator bit stream are set to an off value;
means for transmitting the broadcast indicator bit stream; and
means for transmitting at a predetermined time slot subsequent to transmitting the broadcast indicator bit stream one or more general paging messages comprising one or more broadcast pointers corresponding to said broadcast message categories.

24. The apparatus of claim 23 wherein system time is additionally used as an input to the pre-defined hashing function.

25. The apparatus of claim 23 wherein said means for transmitting the broadcast indicator bit stream transmits the broadcast indicator bit stream on an auxiliary channel as an uncoded, on-off keying (OOK) modulated direct sequence spread spectrum signal.

26. The apparatus of claim 25 wherein the auxiliary channel and a quick paging channel are transmitted at the same time, with slots of the auxiliary channel substantially time-aligned with slots of the quick paging channel.

27. The apparatus of claim 23 wherein said broadcast indicator bit stream is transmitted on a modified quick paging channel that includes a plurality of quick paging slots, and further comprising means for transmitting one or more incoming page indicator bits on the modified quick paging channel;
 wherein said modified quick paging channel comprises a first section of N said broadcast indicator bits, a second section of (QPS-2N)/2 said incoming page indicator bits, and a third section of (QPS-2N)/2 said incoming page indicator bits, where QPS equals the total number of bits in one quick paging slot.

28. The apparatus of claim 27 wherein said first section of N said broadcast indicator bits comprises first and second sets of said broadcast indicator bits, with each set having N/2 said broadcast indicator bits and wherein pairs of corresponding said broadcast indicator bits from said first and second sets are mutually redundant bits.

29. The apparatus of claim 23 wherein said broadcast indicator bit stream is overlaid with one or more incoming page indicator bits on a modified quick paging channel.

* * * * *